INVENTOR.
EERENST F. HOVIUS
BY
AGENT

United States Patent

Hovius

[15] 3,671,755

[45] June 20, 1972

[54] APPARATUS FOR ALIGNING TWO OBJECTS WHICH COMPRISES A SOURCE OF LIGHT, A PHOTOSENSITIVE DETECTION SYSTEM AND TWO PATTERN CARRIERS

[72] Inventor: Eerenst Frans Hovius, Emmasingel, Eindhoven, Netherlands

[73] Assignee: U.S. Philips Corporation, New York, N.Y.

[22] Filed: Sept. 17, 1970

[21] Appl. No.: 73,135

[30] Foreign Application Priority Data

Sept. 24, 1969 Netherlands ..........6914531

[52] U.S. Cl. ..........250/237 R, 356/169

[51] Int. Cl. ..........H01j 3/14

[58] Field of Search ..........250/208, 216, 219 D, 219 DC, 250/219 DD, 220, 231, 237 R, 237 G; 356/169, 170

[56] References Cited

UNITED STATES PATENTS 3,487,399 12/1969 Wogatzke ..........250/237

3,253,153 5/1966 Stoddard ..........250/231

*Primary Examiner*—James W. Lawrence

*Assistant Examiner*—D. C. Nelms

*Attorney*—Frank R. Trifari

[57] ABSTRACT

An apparatus for the relative alignment of two objects is described which comprises at least one light source, a photosensitive detection system and two carriers which are made of a translucent material or an opaque material and on which have been formed patterns of areas of an opaque material or a translucent material respectively. It is shown that a direct indication of the direction of a deviation is obtainable by using a special embodiment in which the patterns of the carriers each consist of two regular component patterns, one of the component patterns on one of the carriers being staggered with respect to the other component pattern on this carrier through a small distance in the direction of width of the areas, the region to one side of one of the component patterns and that to the other side of the other component pattern on this carrier being made of an opaque material, while with each of the said component patterns there is associated a separate detector.

4 Claims, 9 Drawing Figures

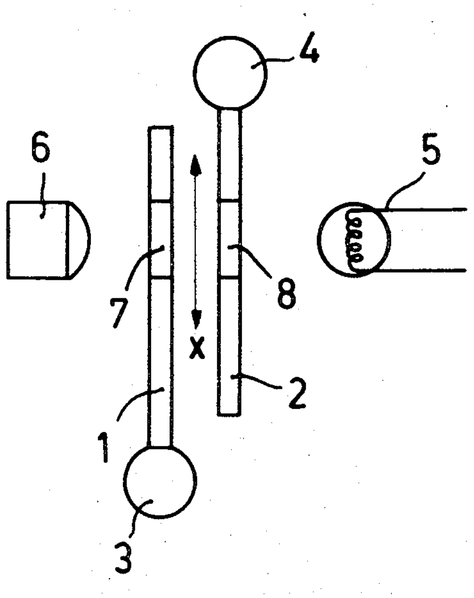

*INVENTOR.*

EERENST F. HOVIUS

*BY*

AGENT

Figure 1:
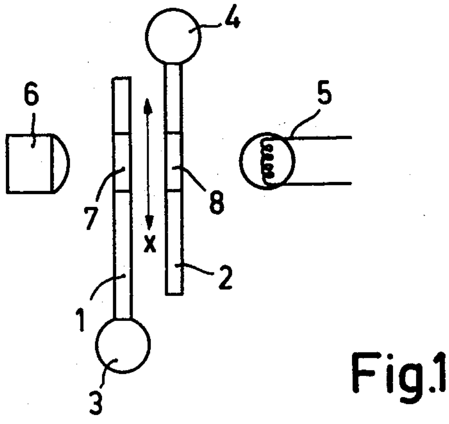

APPARATUS FOR ALIGNING TWO OBJECTS WHICH COMPRISES A SOURCE OF LIGHT, A PHOTOSENSITIVE DETECTION SYSTEM AND TWO PATTERN CARRIERS

"An apparatus for aligning two objects which comprises a source of light, a photosensitive detection system and two pattern carriers."

The invention relates to an apparatus for the relative alignment of two objects which comprises at least one source of light, a photosensitive detection system and two carriers which are made of a translucent or opaque material on which had been formed patterns of areas made of an opaque or translucent material respectively.

The carriers may be separate plates which are each rigidly secured to one of the objects which are to be relatively aligned. Such apparatus is of great importance for positioning machine tools, such as a lathe, in which one of the plates is fastened to the lathe bed and the other to the carriage.

However, the carriers may alternatively form part of the object such as the films which are used in manufacturing integrated circuits and on which the patterns for photographic masks have been provided. In manufacture, reference patterns are printed on the film together with the patterns for the masks and are subsequently used for aligning the films.

British Pat. Specification No. 1,014,405 describes an apparatus for the first mentioned type which allows of ascertaining whether two objects are in correct relative positions. A plate provided with alternate translucent and opaque areas which extend in a direction at right angles to the direction in which relative displacement of the object may take place, is rigidly secured to one of the objects. A similar but complementary pattern is provided on a second object. When the two objects are correctly positioned relative to one another the translucent areas of one plate are shielded by the opaque areas of the other plate, and conversely. The light emitted by a light source cannot pass through the plates and no electric signal is produced in a photodetector arranged behind the plates. If one of the objects is moved out of this datum position, light passes through the plates so that an electric signal can be derived from the photodetector. The successive areas of the patterns may have different widths.

Such an apparatus suffers from several disadvantages. Frequently it is desired to directly ascertain in which direction the deviation from the correct relative positions of the objects takes place. This is not possible with the apparatus described. Further, a sufficient degree of accuracy requires the use of a large number of translucent and opaque areas. Also, to achieve a high degree of accuracy the width of the narrowest area must be very small. Finally the patterns of areas must be formed with a high degree of accuracy.

The disadvantages of the positioning apparatus described, in which the carriers are separate plates secured to the objects, also apply to the case in which the carriers form part of the objects to be aligned.

It is an object of the present invention to obviate the said disadvantages. For this purpose an apparatus according to the invention is characterized in that the pattern on each carrier comprises two regular component patterns, one of the component patterns on one of the carriers being staggered relative to the other component pattern on this carrier through a small distance in the direction of width of the areas, while the region to one side of one of the component patterns and that to the other side of the other component pattern on this carrier are made of an opaque material, a separate detector being associated with each of the component patterns.

A high degree of accuracy of alignment is obtainable with simple means, such as a photosensitive cell and a differential amplifier. The apparatus according to the invention directly indicates the direction in which the objects are to be moved to reach the correct positions. With respect to the surface area used the amount of transmitted light is comparatively large. The apparatus according to the invention permits two-dimensional alignment. Finally, the apparatus permits the determination of the correct positions of objects which are capable of assuming several relative positions.

Figure 2:
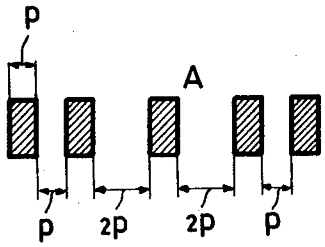
Figure 3:
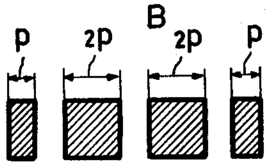
Figure 4:
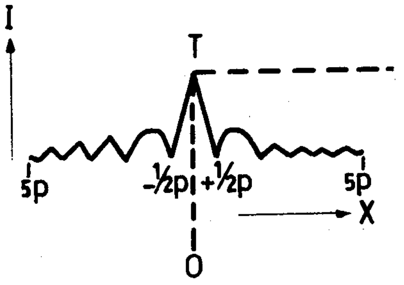
Figure 5:
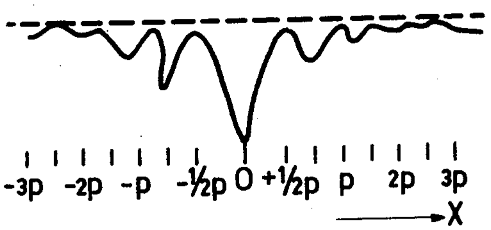
Figure 6:
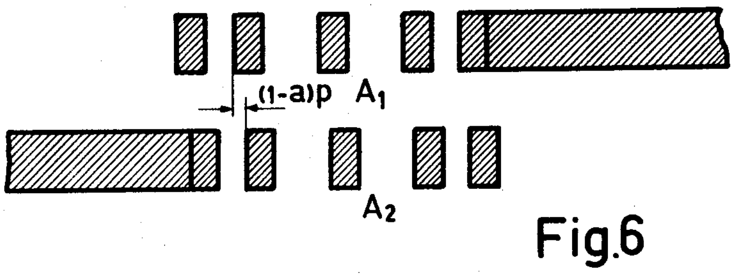
Figure 7:
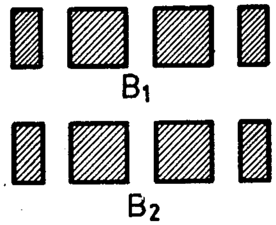
Figures 8, 9:
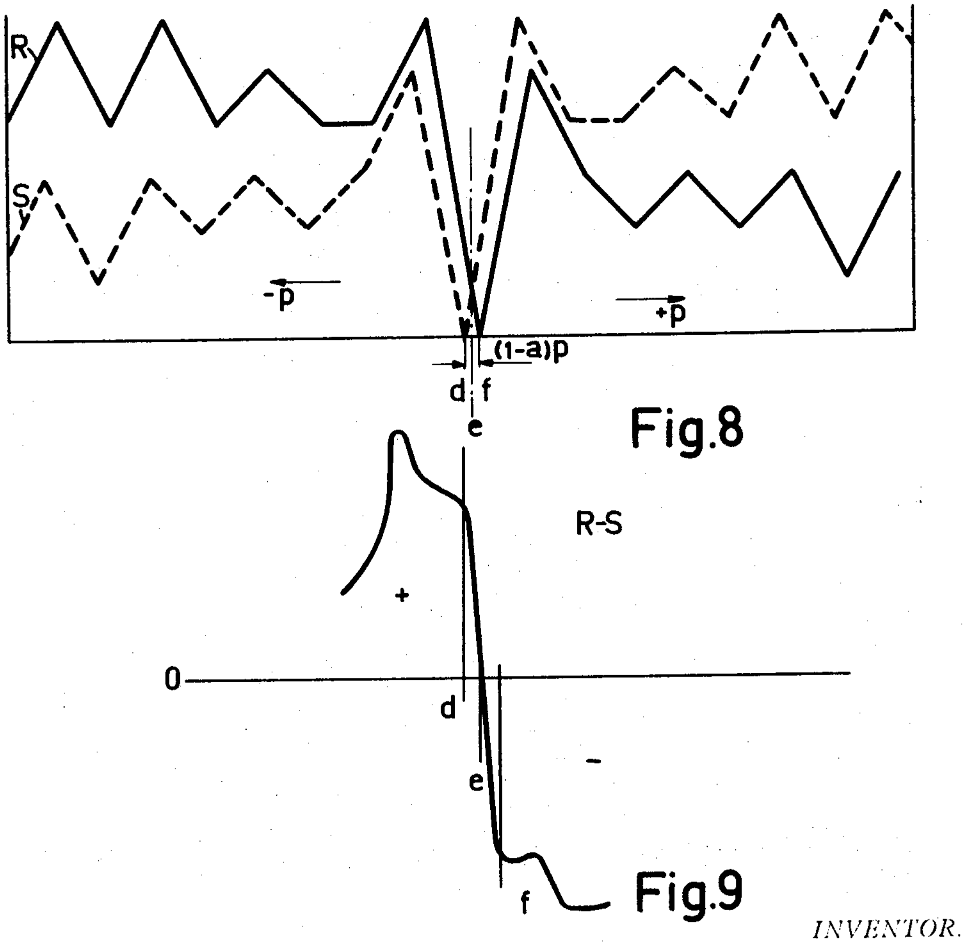

Embodiments of the invention will now be described, by way of example, with reference to the accompanying diagrammatic drawings, in which:

FIG. 1 shows a known apparatus for aligning objects, in which apparatus the pattern carriers are separate plates, FIGS. 2 and 3 show patterns of translucent and opaque areas, FIGS. 4 and 5 show the associated light intensities as functions of the displacement, FIGS. 6 and 7 show patterns according to the invention, FIG. 8 shows the variations of the light intensities when the component pattern $A_1$ of FIG. 6 is used in combination with the component pattern $B_1$ of FIG. 7 and when the component pattern $A_2$ of FIG. 6 is used in combination with the component pattern $B_2$ of FIG. 7, and FIG. 9 shows the difference of the voltages produced in the photodetectors arranged behind the combination $A_1$ $B_1$ and the combination $A_2B_2$ as a function of the displacement.

Referring now to FIG. 1, plates 1 and 2 made of a transparent material are rigidly secured to objects 3 and 4. Both objects may be movable. Alternatively, one of the objects may be fixed and the other object may be moved relative to the first object. The direction of movement is indicated by a double arrow. The plate 1 is provided with a pattern 7 of areas of an opaque material. A similar pattern 8 is provided on the plate 2. Depending on the relative positions of the plates part of the light emitted by a source of light 5 may pass through both patterns to fall on a photosensitive cell 6.

The regular aperiodic pattern 8 of the plate 2 may have the form A shown in FIG. 2. This pattern A comprises several areas of an opaque material which each have a width $p$ and are spaced from one another by distances $p$, $2p$, $2p$ and $p$. For simplicity in this and the following Figures only 5 areas are shown, but obviously the number of areas may be extended to comprise $(2n + 1)$ areas spaced from one another by distances $p$, $2p, \ldots (n-1)p, np, (n-1)p, \ldots, 2p, p$. As an alternative, $(2n + 1)$ areas may be provided which are spaced from one another by distances $p, 2p, \ldots, np, \ldots, 2np$. However, with a symmetrical arrangement of the areas the amount of transmitted light will be greater.

The pattern 7 on the plate 1 may have the form A also or it may have the form of complementary pattern B shown in FIG. 3. The term "complementary" is used herein to mean that the translucent and opaque areas of A and B are interchanged, as a comparison of FIGS. 2 and 3 will show. In the Figures the opaque areas are shown shaded.

When two carriers having the same pattern A are relatively moved, the light transmitted by the two carriers has an intensity I as a function of the displacement X, as is shown in FIG. 4. With correct relative positioning of the carriers and hence of the objects the translucent parts of the carriers register with one another and the amount of transmitted light is a maximum. If one of the plates is shifted to the left or to the right through a distance ½$p$, the intensity of the transmitted light will be a minimum.

FIG. 5 shows the intensity of the transmitted light as a function of the relative displacement of the carriers for the case in which the latter are provided with complementary patterns. With correct relative positioning of the objects or of the plates no light is transmitted.

When the aforedescribed patterns are used, determining the correct positioning of the objects amounts to determining the maximum or minimum of the light intensities of FIG. 4 or FIG. 5.

When such patterns are used no direct indication is obtainable of the direction of any deviation from the correct relative positions of the carriers or the objects.

According to the invention, two component patterns $A_1$ and $A_2$ as shown in FIG. 6 are formed on the carrier 2, one above the other in the direction of length of the areas, i.e., in a direction at right angles to the plane of the drawing of FIG. 1. These patterns are mutually staggered in the direction of width of the areas through a distance $(1-a)\,p$. The asymmetric component patterns $A_1$ and $A_2$ have been obtained from the pattern A by rendering opaque the regions to the right $A_1$ and to the left $A_2$ respectively of the areas. On the carrier 1 two identical symmetric component pattern $B_1$ and $B_2$ as shown in FIG. 7 have been formed. The latter component patterns are not mutually staggered.

When the carriers 1 and 2 are relatively moved there is obtained for the combination of the patterns $A_1$ and $B_1$ a variation of the light intensity as a function of the displacement as shown by a curve R of FIG. 8, and for the combination of $A_2$ and $B_2$ a variation as shown by a curve S of FIG. 8. The light transmitted by the patterns $A_1$ and $B_1$ respectively $A_2$ and $B_2$ is received by two separate photoelectric cells and converted in electrical signals. These signals are applied to a differential amplifier, not shown. The output signal of this differential amplifier as a function of the relative displacement of the two carriers is shown in FIG. 9. The pattern $A_1$ and $B_1$ and the patterns $A_2$ and $B_2$ may be illuminated by the same light source or by two different light sources.

A comparison of the two intensity variations, see FIG. 8, shows a point of intersection where the two amounts of light are equal at an accurately defined point *e*. In the datum position of the carriers, which corresponds to this point of intersection, the two photocells deliver electric signals of equal value so that the output voltage of the differential amplifier is 0 volt.

When the carrier of the component patterns $B_1$ and $B_2$ performs a movement to the left from the datum position relative to the carrier of the component patterns $A_1$ and $A_2$, the combination $A_1B_1$ transmits more light than does the combination $A_2B_2$, as a comparison of the curves R and S shows. The photosensitive cell associated with the combination $A_1B_1$ delivers a larger signal than does the photosensitive cell associated with the combination $A_2B_2$, and the output voltage few of the differential amplifier is positive. With a relative movement from this datum position to the right the condition is reversed, the differential amplifier having a negative output voltage.

The great advantage of the use of the patterns described is that one may directly read in which direction the objects are to be moved to reach the point of equality. Since the degree of accuracy is determined by the steepness of the intensity curves, which in the case of small widths of the areas is determined by the number of areas of the patterns, the use of a sufficient number of areas enables a high degree of accuracy to be achieved. This is of importance in particular for the automatic alignment of films on which mask patterns have been printed.

The location of the point of intersection of the intensity curves is independent of the widths of the areas. When the widths of the areas of one pattern or of both patterns are symmetrically increased or reduced the point of intersection does not change its position.

The influence of an asymmetrical error in one of the areas will be smaller in proportion as a larger number of areas are used. Thus, if only one translucent area is used, a dust particle lodging on this area will reduce the amount of light transmitted. As a result the position of the zero point will be shifted. This gives rise to an error. If several areas are used, the zeropoint shift will be reduced by a factor equal to the number of areas.

In a practical embodiment the component patterns $A_1$, $A_2$ and $B_1$, $B_2$ each comprised 5 areas of width 20$\mu$m. The entire length of the assembly of the component patterns $A_1$ and $A_2$ with the opaque regions to the right and to the left thereof was 600$\mu$m. The component patterns $A_1$ and $A_2$ were relatively staggered through a distance of 5$\mu$m, which corresponds to $a = ¾$. The amount of light transmitted is comparatively large with respect to the surface area used. For five areas it was 45.5 percent.

So far the case of relative movement of complementary patterns has been discussed. Obviously the carrier 2 may also be provided with two asymmetric relatively staggered component patterns $B'_1$ and $B'_2$ obtained from the pattern B in a manner similar to that in which $A_1$ and $A_2$ have been obtained from A; in this event the light must pass through identical, slightly relatively staggered patterns.

The apparatus described also allows two-dimensional alignment. For this purpose, each carrier is provided with two patterns the direction of length of the areas of one pattern being at right angles to that of the areas of the other pattern.

When the objects are capable of assuming various relative orientations the apparatus enables the correct positions to be determined in the various orientations also. For this purpose either the patterns of carrier 1 or those of carrier 2 are repeated several times in the direction of length of the carriers. Thus intensity curves as shown in FIG. 8 will be produced at the repetition distances.

As has been remarked hereinbefore, in manufacturing integrated circuits the apparatus according to the invention may be used for the relative alignment of films, for example for the alignment of a film carrying conductivity patterns relative to a film carrying mask patterns. However, the patterns according to the invention may also be used to align photo-masks relative to a wafer of semiconductor material. In this case, instead of a transmission method of reflection method is to be used. Again, the patterns on the film must consist of areas showing light transmission which alternate with areas showing light absorption, whilst the patterns on the wafer comprise areas showing light reflection and areas showing light absorption. Obviously, this method also allows two-dimensional alignment by using a second set of patterns in which the direction of length of the areas is at right angles to that in the first set.

What is claimed is:

1. An apparatus for alignment of two objects, comprising a source of light, first and second means for converting light of a given intensity into an electrical signal of a corresponding intensity, a first regular aperiodic pattern attached to a first of the movable objects and formed of alternating aligned light transmitting and light attenuating areas with an elongated light attenuating area on one end of the first pattern, a second regular aperiodic pattern attached to the first of the movable objects and formed of alternating light transmitting and light attenuating areas substantially identical to the areas of the first pattern aligned parallel to and displaced longitudinally from the first pattern with an elongated light attenuating area on an end of the second pattern opposite the corresponding area on the first pattern, the first and second patterns being disposed respectively between the first and second means and the light source a third pattern on a second of the two objects formed of alternating aligned light transmitting and light attenuating areas in the form of the compliment of the first pattern, a fourth pattern on the second object substantially identical to and aligned parallel with the third pattern, said third and fourth patterns being aligned respectively with the first and second patterns between the light source and the first and second means, the first and second means thereby providing electrical signals having a difference corresponding to the direction and displacement of the objects from a predetermined point.

2. An apparatus as claimed in claim 1, characterized in that each component pattern is symmetrical about its center.

3. An apparatus as claimed in claim 1, characterized in that the patterns form part of the first and second objects.

4. An apparatus as claimed in claim 1, characterized in that the patterns are on separate plates each secured to one of the objects.

* * * * *